US012663140B2

(12) United States Patent
Freudenberger et al.

(10) Patent No.: US 12,663,140 B2
(45) Date of Patent: Jun. 23, 2026

(54) CORNER DEFLECTION ELEMENT FOR AN LED LIGHTING STRIP

(71) Applicant: Häfele Technology Solutions Gmbh & Co KG, Stuttgart (DE)

(72) Inventors: Sascha Freudenberger, Bietigheim-Bissingen (DE); Simon Frech, Urbach (DE)

( * ) Notice: Subject to any disclaimer, the term of this patent is extended or adjusted under 35 U.S.C. 154(b) by 0 days.

(21) Appl. No.: 19/079,254

(22) Filed: Mar. 13, 2025

(65) Prior Publication Data

US 2025/0207758 A1 Jun. 26, 2025

Related U.S. Application Data

(63) Continuation of application No. PCT/EP2023/074952, filed on Sep. 12, 2023.

(51) Int. Cl.

*F21V 7/04* (2006.01)
*F21S 4/22* (2016.01)
*F21V 19/00* (2006.01)
*F21Y 115/10* (2016.01)

(52) U.S. Cl.

CPC ................ *F21V 7/043* (2013.01); *F21S 4/22* (2016.01); *F21V 19/003* (2013.01); *F21Y 2115/10* (2016.08)

(58) Field of Classification Search

CPC ........ F21V 7/043; F21V 19/003; F21V 21/08; F21S 4/22; F21S 8/037; F21S 4/24

See application file for complete search history.

(56) References Cited

U.S. PATENT DOCUMENTS 6,928,951 B2 * 8/2005 Huang ..................... B60Q 7/00 116/63 P
10,378,747 B1 * 8/2019 Hanslip ..................... F21S 4/24

(Continued)

FOREIGN PATENT DOCUMENTS

CN 210485365 U 5/2020
CN 212456384 U 2/2021

(Continued)

OTHER PUBLICATIONS

"Free STL file Hot Wheel Track 90 deg Turn, 10 deg Bank w/ Improved Joiner (100mm, 150mm, 200mm Radius)", Sep. 1, 2020, pp. 3 (https://cults3d.com/en/3d-model/game/hot-wheel-track-90-deg-turn-10-deg-bank-w-improved-joiner-100mm-150mm-200mm-radius).

(Continued)

*Primary Examiner* — Christopher E Dunay

(74) *Attorney, Agent, or Firm* — Orbit IP, LLP; Marc G. Martino

(57) ABSTRACT

A corner deflection element for a lighting strip has a lower side which forms a flat base surface. A strip-shaped upper-side guide track is for the lighting strip, which has two track legs that are angled against each other in relation to the flat base surface by an angle of between about 45° and about 135° and, in particular, by about 90°. A corner deflection track section is located between the two track legs and stands upright above the two track legs. An outwardly downward sloping transverse inclination of the corner deflection track section relative to the flat base surface is greater than an outwardly downward sloping transverse inclination of the two track legs.

20 Claims, 3 Drawing Sheets

(56) References Cited

U.S. PATENT DOCUMENTS

| | | | | |
|---|---|---|---|---|
| 11,635,177 | B1 * | 4/2023 | Kay | F21V 15/012 362/235 |
| 11,982,422 | B2 | 5/2024 | Wanjiong | |
| 2005/0162850 | A1 * | 7/2005 | Luk | H05B 45/20 362/227 |
| 2018/0283661 | A1 * | 10/2018 | Zanotto | F21S 4/20 |
| 2019/0331311 | A1 * | 10/2019 | Crompvoets | F21S 43/2815 |
| 2023/0400161 | A1 * | 12/2023 | Trundle | B60Q 3/46 |

FOREIGN PATENT DOCUMENTS

| | | | |
|---|---|---|---|
| CN | 216388604 | U | 4/2022 |
| CN | 115013749 | A | 9/2022 |
| DE | 20 2010 000 363 | U1 | 4/2011 |
| KR | 10-2010-0129414 | A | 12/2010 |

OTHER PUBLICATIONS

"Hot Wheels Compatible 90 Degree Banked Turn (Blue)", Mar. 1, 2022, pp. 4 (https://www.amazon.com/Wheels-Compatible-Degree-Banked-Turn/dp/B09W333D9D?th=I).

* cited by examiner

CORNER DEFLECTION ELEMENT FOR AN LED LIGHTING STRIP

CROSS-REFERENCE TO RELATED APPLICATIONS

This continuation application claims priority to PCT/EP2023/074952 filed on Sep. 12, 2023, which has published as WO 2024/061684 A1, and also the German application number DE 20 2022 105 253.0 filed on Sep. 19, 2022, the entire contents of which are fully incorporated herein with these references.

FIELD OF THE INVENTION

The invention relates to a corner deflection element for a lighting strip, in particular, an LED strip, and to an associated lighting arrangement having such a corner deflection element.

BACKGROUND OF THE INVENTION

In order to illuminate the interior spaces of furniture, lighting strips (for example LED lighting strips) that are equipped with lighting elements only on one of their two sides are used. The lighting strips are for example adhesively bonded internally onto the furniture walls, but in inner corners the lighting strips can be laid only in an undefined way and therefore not reproducibly. This may lead to shadowing of the lighting strip, or to the strip side equipped with lighting elements not being directed inward as desired. Such cases give rise to unlit or asymmetrically lit inner corners. In the past, the problem has been overcome by laying two lighting strips, which are electrically connected to one another in the inner corners by means of a separate coupling piece. For this purpose, the coupling piece needs to be positioned and fixed in the inner corner.

SUMMARY OF THE INVENTION

In contrast thereto, the object of the present invention is to lay a lighting strip in an inner corner without interrupting the lighting pattern and without separate coupling pieces, as simply as possible and with little installation outlay.

This object is achieved according to the invention by a corner deflection element for a lighting strip, in particular, an LED strip, comprising: a lower side, which forms a flat base surface, and an, in particular, strip-shaped, upper-side guide track for the lighting strip, which has two track legs that are angled against each other in relation to the flat base surface by an angle of between about 45° and about 135°, in particular, by about 90°, and a corner deflection track section which is located between the two track legs and stands upright above the two track legs, wherein an inwardly downward sloping transverse inclination of the corner deflection track relative to the flat base surface is greater than an inwardly downward sloping transverse inclination of the two track legs.

According to the invention, the guide track ensures that the lighting strip resting thereon is always oriented with its side equipped with lighting elements oriented outward and unlit or shadowed inner corners are therefore prevented. The lighting strip is fastened on the corner deflection element and held bearing on the guide track. The installation outlay of lighting strips that change direction is significantly reduced and simplified.

Particularly advantageously, as seen in the track length direction from the free track end to the corner deflection track section, the outer edges of the two track legs rise in relation to the flat base surface because of the increasing transverse inclination. The inner edges of the two track legs may (but need not) remain unchanged at the original height of the free track ends and migrate increasingly further outward, so as to ensure a constant width of the guide track along the entire guide track.

Preferably, the transverse inclination of the free track ends of the two track legs is between 0° and about 5°, in particular, 0°, and the transverse inclination of the corner deflection track section is between about 80° and 90°, in particular, 90°.

The corner deflection track section may for example have a rounded, in particular, partially cylindrically curved inner corner as a supporting surface for the lighting strip.

Particularly preferentially, as seen in the track length direction from the free track end of the two track legs to the corner deflection track section, it is provided that the inwardly downward sloping transverse inclination of the two track legs increases continuously and transitions, in particular, steplessly, into the outwardly downward sloping transverse inclination of the corner deflection track section, so as to form a continuous supporting surface for the lighting strip.

Particularly preferentially, the corner deflection element has at least two first hooks, which each engage laterally over the two track legs, and/or at least one second hook which engages laterally over the corner deflection track section on the side of the corner deflection track section facing away from the flat base surface. The lighting strip is hooked into the corner deflection element by means of the first and/or second hooks and held bearing on the guide track. The installation outlay of lighting strips that change direction is significantly reduced and simplified.

Particularly advantageously, as seen in the track length direction from the free track end to the corner deflection track section, the outer edges of the two track legs rise as far as the height of the at least second hook because of the increasing transverse inclination. The inner edges of the two track legs may (but need not) remain unchanged at the original height of the free track ends and migrate increasingly further outward, so as to ensure a constant width of the guide track along the entire guide track.

The first hooks may each engage laterally over the two track legs from the inner sides and/or outer sides of the two track legs, preferentially in each case on the free track ends of the two track legs.

In order to save material and simplify the production process, the track legs and/or the corner deflection track section may have at least one recess.

Particularly preferentially, at least the corner deflection track section, in particular, the entire corner deflection element, is mirror-symmetric with respect to a plane that runs at a right angle with respect to the flat base surface and in which the angle bisector of the angle lies. This measure leads to a correspondingly mirror-symmetric lighting pattern.

The corner deflection element may particularly advantageously be a single-piece injection-molded part made of plastic, in particular, transparent plastic.

Preferably, the flat base surface and/or the guide track are formed as a self-adhesive bonding surface, for example by a double-sided adhesive film being adhesively bonded on the flat base surface or on the guide track.

The invention also relates to a lighting arrangement comprising an inner corner angled by an angle of between about 45° and about 135°, in particular, by about 90°, a lighting strip, in particular, an LED lighting strip, laid along the inner corner, and a corner deflection element configured as above, which is fastened, in particular, adhesively bonded, on the inner corner, wherein the lighting strip is fastened on the corner deflection element and bears on the guide track. The upper side, which is equipped with LEDs, of the LED lighting strip faces inward in the inner corner, so that an unbroken lighting strip that is not interrupted even in the inner corner is obtained.

Preferably, the lighting strip is hooked into the corner deflection element by means of the first and/or second hooks and/or adhesively bonded onto the guide track.

In advantageous embodiments, the inner corner is formed by an angled profile groove having a groove bottom on which the corner deflection element is fastened, in particular, adhesively bonded.

Further advantages of the invention may be found from the description, the claims and the drawing. Likewise, the features mentioned above and those explained in further detail may respectively be used individually or together in any desired combinations. The embodiments shown and described should not be understood as an exhaustive list, but rather are of an exemplary character for describing the invention.

DETAILED DESCRIPTION OF EMBODIMENTS OF THE INVENTION

Figure 1A:
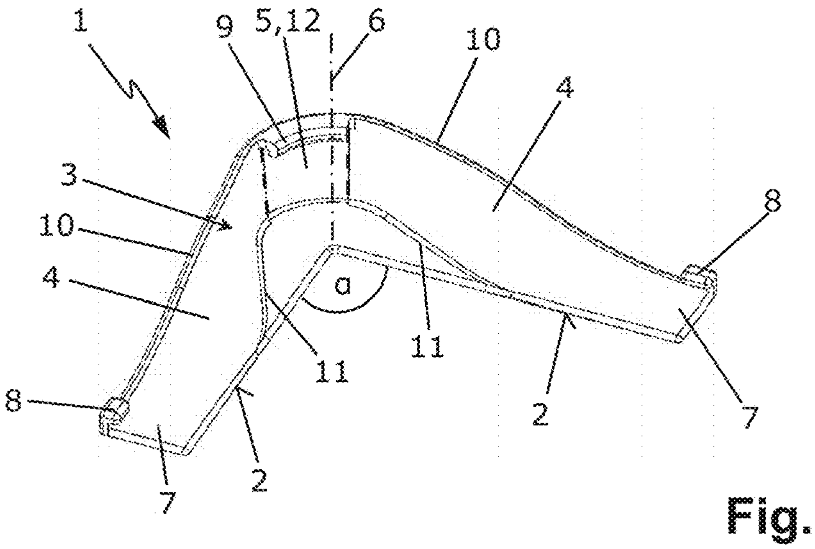
FIGS. 1*a*-1*c* show the corner deflection element according to the invention in a perspective view (FIG. 1*a*), in a plan view (FIG. 1*b*) and in a side view (FIG. 1*c*)
Figure 1B:
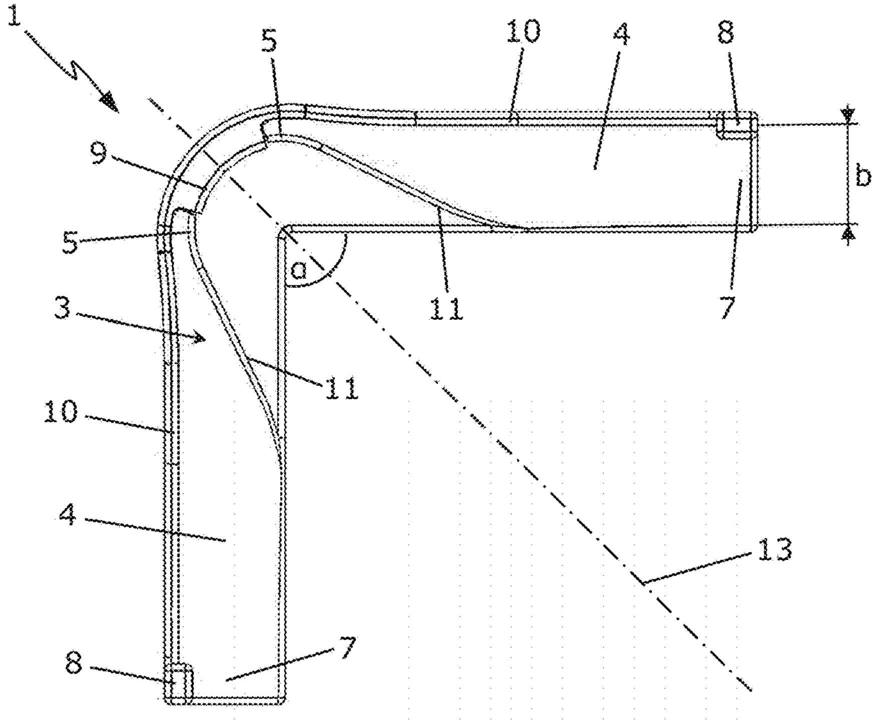
Figure 1C:
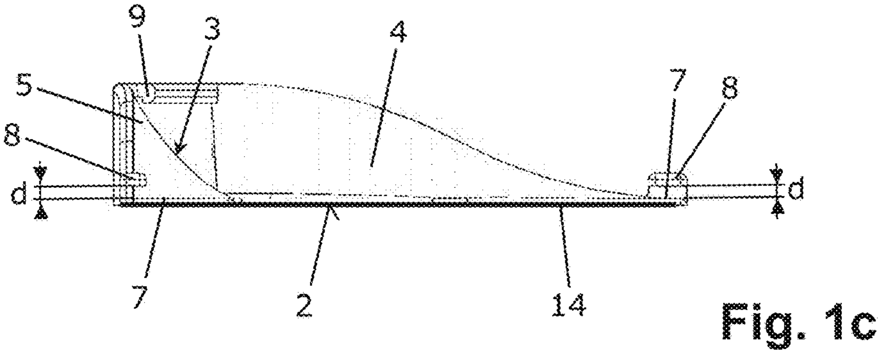

The corner deflection element 1 shown in FIGS. 1*a*-1*c* is used for defined corner deflection of an LED lighting strip in an inner corner of a lighting arrangement and is preferably an injection-molded part made of transparent plastic.

The corner guide element 1 configured here merely by way of example as an angle body comprises a lower side, which forms a flat base surface 2, and an upper-side, here merely by way of example strip-shaped guide track 3 for the lighting strip. The guide track 3 comprises two track legs 4 that are angled against each other in relation to the flat base surface 2 by an angle α of between about 45° and about 135°, here by 90°, and a corner deflection track section 5 which is located between the two track legs 4 and stands upright above the two track legs 4. As shown, the corner deflection track section 5 may be configured to be internally rounded, that is to say it may be curved inward about an axis of curvature 6 that runs at a right angle (or obliquely) with respect to the flat base surface 2. Preferably, the corner deflection track section 5 is partially cylindrically rounded. The guide track 3 may optionally be defined by side edges of the corner guide element 1 or by a groove in the corner guide element 1.

The transverse inclination of the free track ends 7 of the two track legs 4 relative to the flat base surface 2 is 0°, while the corner deflection track section 5 has an outwardly downward sloping transverse inclination of about 90°. As seen in the track length direction from the free track end 7 of the two track legs 4 to the corner deflection track section 5, the outwardly downward sloping transverse inclination of the two track legs 4 increases continuously and transitions, in particular, steplessly, into the transverse inclination of the corner deflection track section 5. In other words, in FIG. 1 the guide track 3 tilts from horizontal at the one free track end 7 to vertical in the corner deflection track section 5 and back again to horizontal at the other free track end 7.

The corner deflection element 1 respectively comprises two first hooks 8, which each engage laterally, that is to say in the transverse direction, over the free track ends 7 from the outer sides of the two track legs 4, specifically at a distance d that is slightly greater than the track thickness D (FIG. 2*a*) of the LED lighting strip to be guided. The corner deflection element 1 further comprises a second hook 9, here arranged centrally, on the side of the corner deflection track section 5 facing away from the flat base surface 2, which engages laterally over the corner deflection track section 5, specifically at a distance d that is slightly greater than the strip thickness D of the LED lighting strip 15 to be guided. Preferably, the second hook 9 extends along the rounded corner deflection track section 5 and is rounded in a manner corresponding to the corner deflection track section 5.

As shown in FIG. 1*a*, as seen in the track length direction from the free track end 7 to the corner deflection track section 5, the outer edges 10 of the two track legs 4 rise as far as the height of the second hook 9 because of the increasing transverse inclination. Conversely, the inner edges 11 of the two track legs 4 remain unchanged at the original height of the free track ends 7 but migrate increasingly further outward, so as to ensure a constant width b of the guide track 3 along the entire guide track 3.

As indicated by dashes in FIG. 1*a*, the corner deflection track section 5 may have a central recess 12 in order to save material and simplify the production process. As an alternative or in addition, the two track legs 4 may also have such recesses.

Preferably, the corner deflection track section 5, and, in particular, the entire corner deflection element 1, is mirror-symmetric with respect to a plane 13 that runs at a right angle with respect to the flat base surface 2 and in which the angle bisector of the angle α lies.

As shown in FIG. 1*c*, a double-sided adhesive film 14 may be adhesively bonded on the flat base surface 2 so that the flat base surface 2 is configured to be self-adhesive.

In the exemplary embodiment shown, the corner deflection element 1 is an angle body having two angle legs, of which the lower sides form the flat base surface 2 and the upper sides form the guide track 3.

Figure 2A:
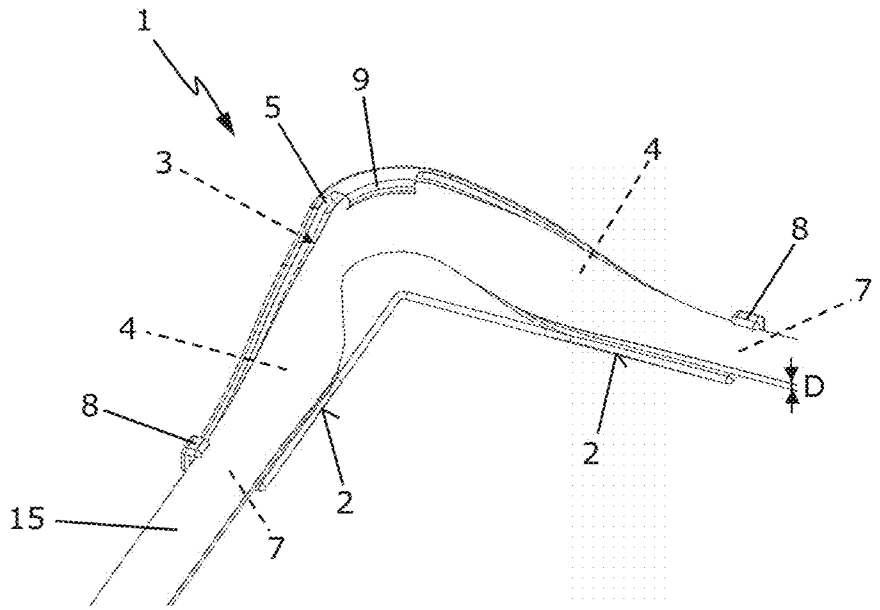
FIGS. 2*a*, 2*b* show the corner deflection element according to the invention with an LED strip guided thereon in a perspective view (FIG. 2*a*) and in a plan view (FIG. 2*b*)
Figure 2B:
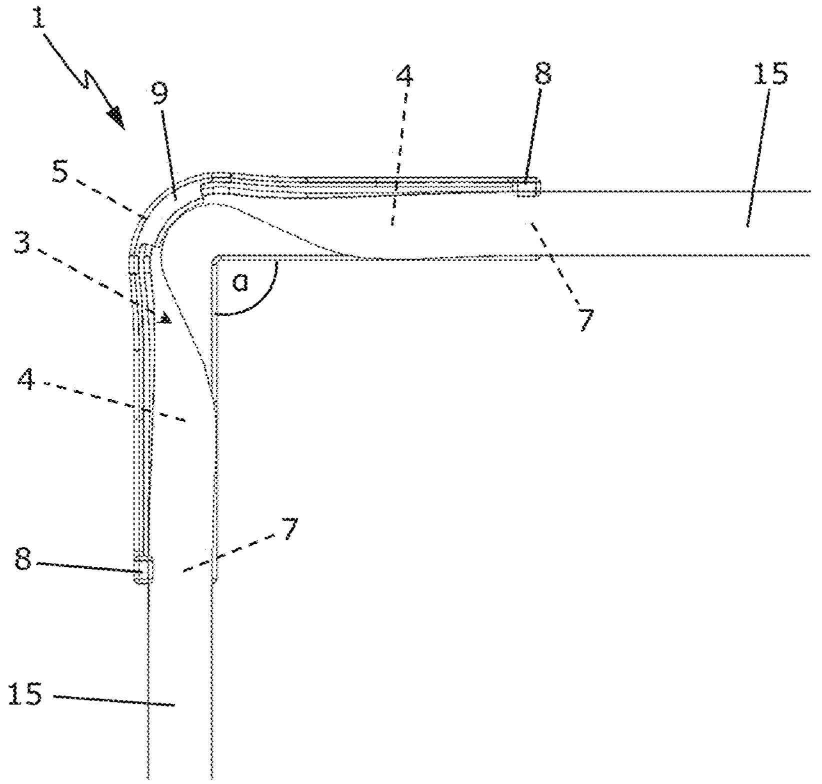

In FIGS. 2*a*, 2*b*, an LED lighting strip 15, which is equipped with LEDs (not shown) on its upper side, is placed onto the guide track 3 and held bearing on the guide track 3 by means of the first and second hooks 8, 9. The contour of the guide track 3 corresponds to the strip contour of the LED lighting strip 15, into which the LED lighting strip 15 is automatically twisted because of its inherent stiffness when its two track legs 4, each with the LED-equipped upper side upward, are aligned at the angle α. The LED lighting strip 15 is hooked into the corner deflection element 1 by means of the first and second hooks 8, 9 and bears with its lower side (not equipped with LEDs) on the guide track 3.

As an alternative or in addition to hooking, the LED lighting strip 15 may also be adhesively bonded onto the guide track 3.

Figure 3A:
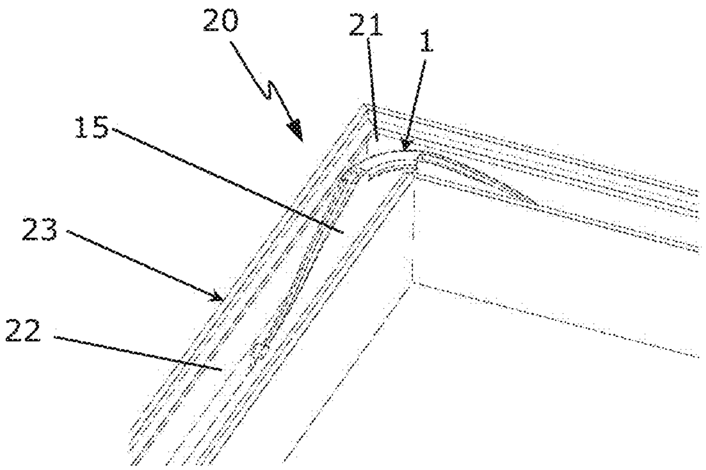
FIGS. 3*a*-3*c* show a lighting arrangement comprising an LED strip that is laid in an inner corner by means of the corner deflection element according to the invention.
Figure 3B:
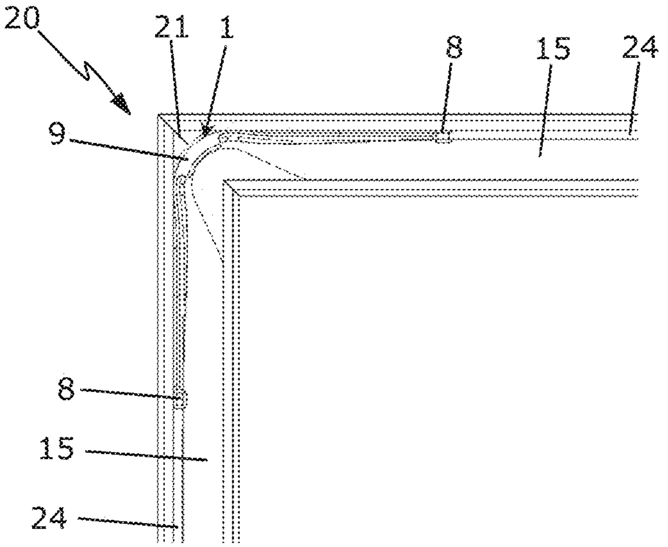
Figure 3C:
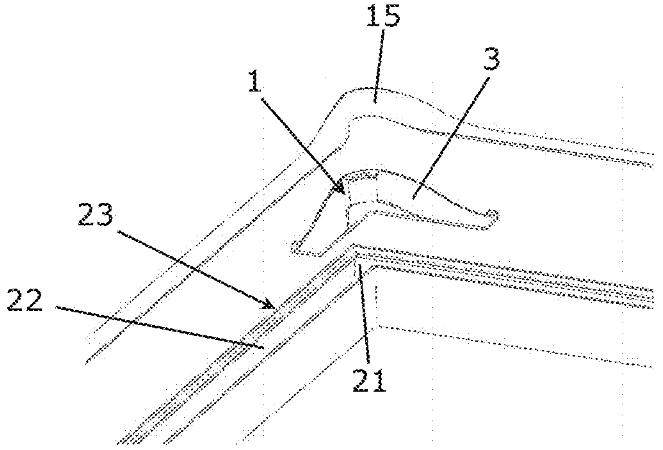

FIGS. 3*a*-3*c* show a lighting arrangement 20 comprising an inner corner 21 angled by an angle α of between about 45° and about 135°, here by 90°, an LED lighting strip 15 laid along the inner corner 21, and a corner deflection element 1. The corner deflection element 1 together with the LED lighting strip 15 hooked into it is fastened on the inner corner 21, for example by means of the double-sided adhesive film 14.

The inner corner 21 may for example, as shown in the exemplary embodiment, be formed by an angled profile groove 22 of a profiled frame 23 (for example made of a metal such as aluminum). For example, the LED lighting strip 15 has a width b of 8 mm and the profile groove 22 has an inner profile cross section of at least 10 mm×10 mm. The LED lighting strip 15 placed into the profile groove 22, with the LED-equipped upper side upward, bears on the groove bottom 24 of the profile groove 22 and is for example adhesively bonded on the groove bottom 24 by means of the double sided adhesive film 14. At the inner corner 21, the LED lighting strip 15 is deflected in a defined manner by means of the corner deflection element 1 adhesively bonded onto the groove bottom 24. The upper side, which is equipped with LEDs, of the LED lighting strip 15 faces upward in the profile groove 22 and inward in the inner corner 21, so that a continuous lighting strip that is not interrupted even in the inner corner 21 is obtained overall. Unlit inner corners are therefore avoided in the lighting arrangement 20. The profile groove 22 may be sealed with a translucent cover (not shown here).

What is claimed is:

1. A corner deflection element for a lighting strip or an LED strip, comprising:

a lower side, which forms a flat base surface;

a upper-side guide track including the lighting strip or the LED strip, which has two track legs that are angled against each other in relation to the flat base surface by an angle (α) of between about 45° and about 135°; and a corner deflection track section which is located between the two track legs and stands upright above the two track legs;

wherein an outwardly downward sloping transverse inclination of the corner deflection track section relative to the flat base surface is greater than an outwardly downward sloping transverse inclination of the two track legs.

2. A lighting strip corner deflection element for a lighting strip or an LED strip, comprising:

a lower side, which forms a flat base surface;

a upper-side guide track including the lighting strip or the LED strip, which has two track legs that are angled against each other in relation to the flat base surface by an angle (α) of between about 45° and about 135°; and a corner deflection track section which is located between the two track legs and stands upright above the two track legs;

wherein an outwardly downward sloping transverse inclination of the corner deflection track section relative to the flat base surface is greater than an outwardly downward sloping transverse inclination of the two track legs; and wherein the contour of the guide track is formed wherein the lighting strip or the LED strip which follows the guide track bears on the guide track.

3. The lighting strip corner deflection element as claimed in claim 2, wherein, as seen in the track length direction from the free track end to the corner deflection track section, the outer edges of the two track legs rise in relation to the flat base surface and the inner edges of the two track legs migrate increasingly further outward.

4. The lighting strip corner deflection element as claimed in claim 2, wherein the transverse inclination of the free track ends of the two track legs is between 0° and about 5° or at 0°.

5. The lighting strip corner deflection element as claimed in claim 2, wherein the transverse inclination of the corner deflection track section is between about 80° and 90° or at 90°.

6. The lighting strip corner deflection element as claimed in claim 2, wherein the corner deflection track section has a rounded or a partially cylindrically curved inner corner.

7. The lighting strip corner deflection element as claimed in claim 2, wherein, as seen in the track length direction from the free track end of the two track legs to the corner deflection track section, the outwardly downward sloping transverse inclination of the two track legs increases continuously and transitions or transitions steplessly into the outwardly downward sloping transverse inclination of the corner deflection track section.

8. The lighting strip corner deflection element as claimed in claim 2, wherein at least two first hooks, which each engage laterally over the two track legs, and/or at least one second hook which engages laterally over the corner deflection track section on the side of the corner deflection track section facing away from the flat base surface.

9. The lighting strip corner deflection element as claimed in claim 8, wherein, as seen in the track length direction from the free track end to the corner deflection track section, the outer edges of the two track legs rise as far as the height of the at least one second hook and the inner edges of the two track legs migrate increasingly further outward.

10. The lighting strip corner deflection element as claimed in claim 8, wherein the first hooks each engage laterally over the two track legs from the outer sides of the two track legs.

11. The lighting strip corner deflection element as claimed in claim 8, wherein the first hooks each engage laterally over the two track legs on the free track ends of the two track legs.

12. The lighting strip corner deflection element as claimed in claim 8, wherein the at least one second hook extends along a rounded inner corner of the corner deflection track section.

13. The lighting strip corner deflection element as claimed in claim 2, wherein the track legs and/or the corner deflection track section have at least one recess.

14. The lighting strip corner deflection element as claimed in claim 2, wherein at least the corner deflection track section is mirror-symmetric with respect to a plane that runs at a right angle with respect to the flat base surface and in which the angle bisector of the angle (α) lies.

15. The lighting strip corner deflection element as claimed in claim 2, wherein the lighting strip corner deflection element is an injection-molded part made of plastic or transparent plastic.

16. The lighting strip corner deflection element as claimed in claim 2, wherein the flat base surface and/or the guide track are formed as an adhesive surface.

17. A lighting arrangement comprising an inner corner angled by the angle (α) of between about 45° and about 135° with the lighting strip or the LED strip laid along the inner corner and the lighting strip corner deflection element as claimed in claim 2, which is fastened or adhesively bonded on the inner corner, wherein the lighting strip is fastened on the lighting strip corner deflection element and bears on the guide track.

18. The lighting arrangement as claimed in claim 17, wherein the lighting strip is hooked into the lighting strip corner deflection element by means of a first and/or a second hook and/or adhesively bonded onto the guide track, wherein the first and/or the second hooks each engage laterally over the two track legs.

19. The lighting arrangement as claimed in claim 17, wherein the inner corner is formed by an angled profile groove having a groove bottom on which the lighting strip corner deflection element is fastened or adhesively bonded thereon.

20. The lighting strip corner deflection element as claimed in claim 2, wherein the guide track has an outer track edge and an inner track edge which have the same length.

* * * * *